United States Patent
Liu

(12) United States Patent (10) Patent No.: US 7,443,119 B2
Liu (45) Date of Patent: Oct. 28, 2008

(54) CIRCUIT AND METHOD FOR CONTROLLING THE ROTATING SPEED OF A BLDC MOTOR

(75) Inventor: Kwang-Hwa Liu, Sunnyvale, CA (US)

(73) Assignee: Green Mark Technology Inc., Taipei County (TW)

( * ) Notice: Subject to any disclaimer, the term of this patent is extended or adjusted under 35 U.S.C. 154(b) by 70 days.

(21) Appl. No.: 11/682,883

(22) Filed: Mar. 7, 2007

(65) Prior Publication Data

US 2008/0219648 A1 Sep. 11, 2008

(51) Int. Cl.
*H02P 6/00* (2006.01)
(52) U.S. Cl. ............. 318/400.01; 318/599; 318/400.38; 388/800; 388/811
(58) Field of Classification Search .................. 318/599, 318/400.01, 400.07, 400.38; 388/800, 804, 388/811, 819
See application file for complete search history.

(56) References Cited

U.S. PATENT DOCUMENTS

| | | | |
|---|---|---|---|
| 6,392,372 B1* | 5/2002 | Mays, II | 318/400.01 |
| 6,529,393 B1* | 3/2003 | Yu | 363/41 |
| 2005/0031322 A1* | 2/2005 | Boyle et al. | 388/800 |
| 2007/0152624 A1* | 7/2007 | Hamaoka et al. | 318/805 |

\* cited by examiner

*Primary Examiner*—Rina I Duda
(74) *Attorney, Agent, or Firm*—Jianq Chyun IP Office

(57) ABSTRACT

A circuit and a method for controlling the rotating speed of a brushless direct current (BLDC) motor are provided, whose goal is solving the stall problem encountered by conventional BLDC motors driven by pulse width modulation (PWM). The circuit includes a closed-loop control mechanism for adjusting the duty cycle of the motor current of the BLDC motor, thus controlling the rotating speed of the motor. The closed-loop control is based on the comparison of a signal proportional to the actual rotating speed and another signal proportional to the predetermined target rotating speed.

14 Claims, 7 Drawing Sheets

CIRCUIT AND METHOD FOR CONTROLLING THE ROTATING SPEED OF A BLDC MOTOR

BACKGROUND OF THE INVENTION

1. Field of the Invention

The present invention relates to a brushless direct current (BLDC) motor. More particularly, the present invention relates to a circuit and a method for controlling the rotating speed of a BLDC motor.

2. Description of the Related Art

FIG. 1 is a schematic diagram showing a conventional BLDC motor and its drive circuit. The BLDC motor includes a rotor 102 and stator coils P1-P4. Rotor 102 is a permanent magnet with two magnetic north poles (N1 and N2) and two magnetic south poles (S1 and S2). The position of Hall sensor HS is fixed relative to stator coils P1-P4. Hall sensor HS provides a Hall sensor signal whose state changes in response to the position of rotor 102 relative to stator P1-P4. In particular, the Hall sensor signal is high (logic 1) when N1 or N2 is the closer to Hall sensor HS among the magnetic poles, while the Hall sensor signal is low (logic 0) when S1 or S2 is the closer to Hall sensor HS among the magnetic poles.

Control circuit 101 drives the BLDC motor by turning on and turning off the metal oxide semiconductor field effect transistors (MOSFETs) Q1-Q4 according to the Hall sensor signal. The level shifters LS amplify the output of control circuit 101 in order to drive the high-side MOSFETs Q1 and Q2. When magnetic pole S1 is near stator coil P1, N1 is the closest to Hall sensor HS among the magnetic poles. Therefore the Hall sensor signal is high, control circuit 101 turns off MOSFETs Q2 and Q3, turns on Q1 and Q4, and the motor current flows through Q1, PA, P4, P1, P2, P3, PB and finally through Q4, turning stator coils P1 and P3 into magnetic south poles and stator coils P2 and P4 into magnetic north poles. At this moment P1 and P3 attract the north poles N1 and N2 and repel the south poles S1 and S2. P2 and P4 attract the south poles and repel the north poles. The rotor spins counter-clockwise. On the other hand, when magnetic pole N1 moves to right under stator coil P1, S2 is the closest to Hall sensor HS among the magnetic poles. Therefore the Hall sensor signal is low, control circuit 101 turns off MOSFETs Q1 and Q4, turns on Q2 and Q3, and the motor current flows through Q2, PB, P3, P2, P1, P4, PA and finally through Q3, turning stator coils P1 and P3 into magnetic north poles and stator coils P2 and P4 into magnetic south poles. At this moment P1 and P3 repel the north poles and P2 and P4 attract the north poles. As a result, the BLDC motor is driven continuously in the counter-clockwise direction.

It is usually preferable to be able to control the rotating speed of a motor. For example, in light load conditions the rotating speed may be lowered to save energy and reduce noises. FIG. 2 is a schematic diagram showing such a solution. The pulse width modulation (PWM) circuit 202 provides a PWM signal according to a given duty cycle setting. Logic circuit 203 distributes the PWM signal to MOSFETs Q1 and Q4 when the Hall sensor signal from Hall sensor HS is high and distributes the PWM signal to MOSFETs Q2 and Q3 when the Hall sensor signal is low. The level shifters LS amplify the PWM signal in order to drive the high-side MOSFETs Q1 and Q2. Motor 204 is a representation which includes rotor 102 and stator coils P1-P4 in FIG. 1.

PWM circuit 202 includes a clock and ramp generator 201, a comparator 205 and a flip-flop 206. Clock and ramp generator 201 provides a ramp signal to comparator 205 and a clock signal to flip-flop 206. Flip-flop 206 receives the clock signal at the "set" terminal S, receives the output of comparator 205 at the "reset" terminal R, and outputs the PWM signal. At the beginning of each cycle of the clock signal the PWM signal is set to the high state. Comparator 205 compares the ramp signal and the duty cycle setting, which is a voltage signal. When the level of the ramp signal is higher than the duty cycle setting, comparator 205 asserts its output and the PWM signal is reset to the low state. The higher the duty cycle setting, the longer the duty cycle of the PWM signal.

FIG. 3 shows the waveforms of the Hall sensor signal and the motor current of motor 204. When the Hall sensor signal is high, MOSFETs Q1 and Q4 are turned on, MOSFETs Q2 and Q3 are turned off, and the direction of the motor current is from PA to PB. When the Hall sensor signal is low, MOSFETs Q2 and Q3 are turned on, MOSFETs Q1 and Q4 are turned off, and the direction of the motor current is from PB to PA. The duty cycle of the motor current is determined by the widths of the pulses. As an example, the duty cycle of the motor current is 0.25 from the moment T1 to the moment T3, while the duty cycle of the motor current is 0.5 from the moment T3 to the moment T6. As shown in FIG. 3, the pulse width corresponding to a duty cycle of 0.5 is twice as large as the pulse width corresponding to a duty cycle of 0.25. The higher the duty cycle, the longer the motor current flows, thus the higher the torque and the rotating speed. It can be easily seen that the PWM signal and the motor current have the same duty cycle. Here the duty cycle of the motor current is the proportion of each cycle where the motor current is non-zero. PWM circuit 202 controls the duty cycle of the PWM signal according to its duty cycle setting, which controls the motor current and the rotating speed of motor 204.

FIG. 4A is a plot of torque vs. rotating speed of BLDC motors and their loads. There are three motor characteristic curves (410, 412 and 414) and three load characteristic curves (422, 424 and 426). The unit for torque is oz-in (ounce per inch) and the unit for rotating speed is RPM (revolutions per minute).

A traditional BLDC motor driven by a PWM signal, such as motor 204 in FIG. 2, has characteristic curves similar to the curves 410, 412 and 414 in FIG. 4A. Motor curves 410, 412 and 414 correspond to different duty cycles of the motor current (1.0, 0.8 and 0.6, respectively). Given a constant duty cycle, the torque provided by a DC motor gradually decreases as its rotating speed increases. On the other hand, load curves 422, 424 and 426 correspond to different load conditions (light load, medium load and heavy load, respectively). When the load condition is constant, it takes a higher torque to drive the load to a higher speed. A DC motor and a load operate at the intersection of their characteristic curves. For example, when a motor corresponding to curve 414 is coupled to a load corresponding to curve 422, they operate at intersection point A, which is located at a torque of 20 oz-in and a rotating speed of 1500 RPM. If the duty cycle of the motor current or the load condition changes, the intersection point moves accordingly.

One of the drawbacks of motor 204 in FIG. 2 is that, when the rotating speed is low and the load becomes heavy suddenly, motor 204 may slow down drastically, even stall completely. For example, imagine a car driven by motor 204 with a duty cycle of 0.6 (motor curve 414). Initially the car is on level ground and the load corresponds to curve 422. The intersection point is A, and the rotating speed is 1500 RPM. And then the car comes to an up slope. The load condition suddenly changes from curve 422 to curve 424. The intersection point moves from A to B and the rotating speed drops to about 750 RPM. And then the slope gets steeper. The load condition changes to curve 426. The operating point moves from B to S. In this case, motor 204 simply stalls because curves 414 and 426 do not intersect.

SUMMARY OF THE INVENTION

Accordingly, the present invention is directed to a circuit for controlling the rotating speed of a BLDC motor, which solves the stall problem under sudden over-load conditions. The present invention is a closed-loop control mechanism, which provides maximum starting torque and optimum torque vs. speed characteristics at low motor speed.

The present invention is also directed to a closed-loop control method for the rotating speed of a BLDC motor, which has the same purposes and advantages as the control circuit mentioned above does.

According to an embodiment of the present invention, a circuit for controlling the rotating speed of a BLDC motor is provided. The circuit includes a target phase time circuit, an elapsed time counter, a time-out comparator, an error amplifier, a PWM circuit, and a motor drive circuit. The target phase time circuit provides a target phase time signal proportional to a predetermined target rotating speed of the BLDC motor. The elapsed time counter provides an elapsed phase time signal proportional to the elapsed time since the last Hall sensor signal state change. The time-out comparator provides a time-out signal according to the level of the elapsed phase time signal relative to the target phase time signal. The error amplifier provides an error signal according to the level of an actual phase time signal relative to the target phase time signal. The actual phase time signal is obtained by sampling the elapsed phase time signal in response to a predetermined condition of the state of a Hall sensor signal. The state of the Hall sensor signal changes in response to the position of the rotor of the BLDC motor relative to the stator of the BLDC motor. The PWM circuit provides a PWM signal, whose duty cycle is determined according to the time-out signal and the error signal. The motor drive circuit controls the motor current of the BLDC motor according to the PWM signal and the Hall sensor signal. In particular, the duty cycle of the PWM signal determines the duty cycle of the motor current and the state of the Hall sensor signal determines the direction of the motor current.

According to another embodiment of the present invention, a method for controlling the rotating speed of a BLDC motor is provided. The method includes the following steps. First, generate a target phase time signal proportional to a predetermined target rotating speed of the BLDC motor. Then detect the state of Hall sensor signal. The state of the Hall sensor signal changes in response to the position of the rotor of the BLDC motor relative to the stator of the BLDC motor. Generate an elapsed phase time signal proportional to the elapsed time since the last Hall sensor signal state change. Provide a time-out signal according to the level of the elapsed phase time signal relative to the target phase time signal. Next, provide an actual phase time signal by sampling the elapsed phase time signal in response to a predetermined condition of the state of the Hall sensor signal. Provide an error signal according to the level of the actual phase time signal relative to the target phase time signal. Next, provide a PWM signal, whose duty cycle is determined according to the time-out signal and the error signal. Finally, control the motor current of the BLDC motor according to the PWM signal and the Hall sensor signal. The duty cycle of the PWM signal determines the duty cycle of the motor current, and the state of the Hall sensor signal determines the direction of the motor current.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
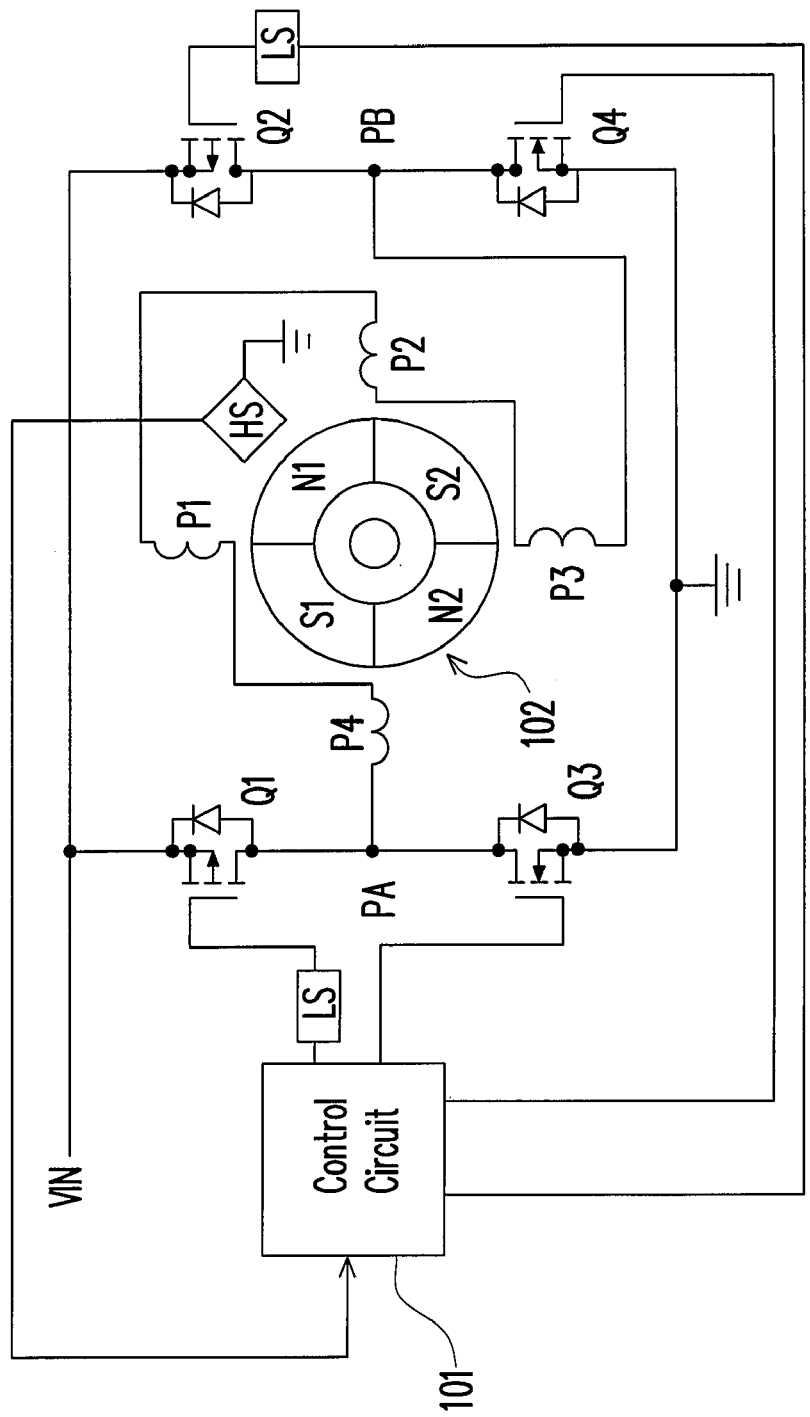
FIG. 1 is a schematic diagram showing a conventional BLDC motor and its drive circuit.

Reference will now be made in detail to the present preferred embodiments of the invention, examples of which are illustrated in the accompanying drawings. Wherever possible, the same reference numbers are used in the drawings and the description to refer to the same or like parts.

Figure 4A:
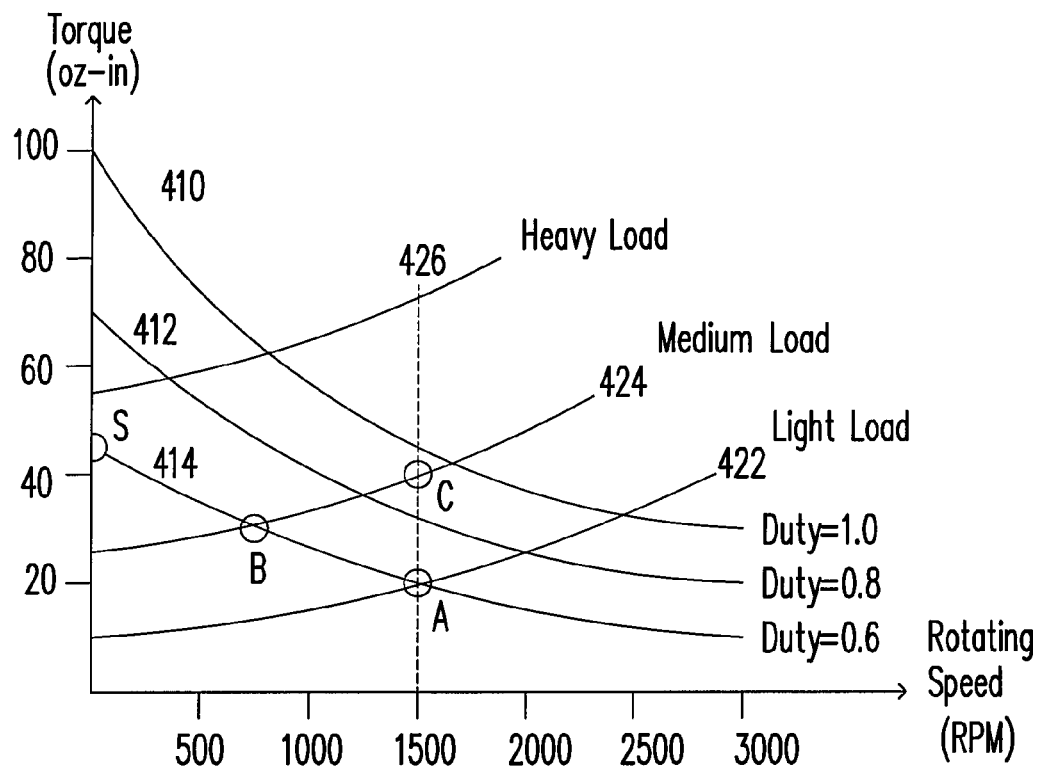
FIG. 4A is a diagram showing the torque-and-rotating-speed characteristics of a BLDC motor using a conventional PWM speed control.
Figure 4B:
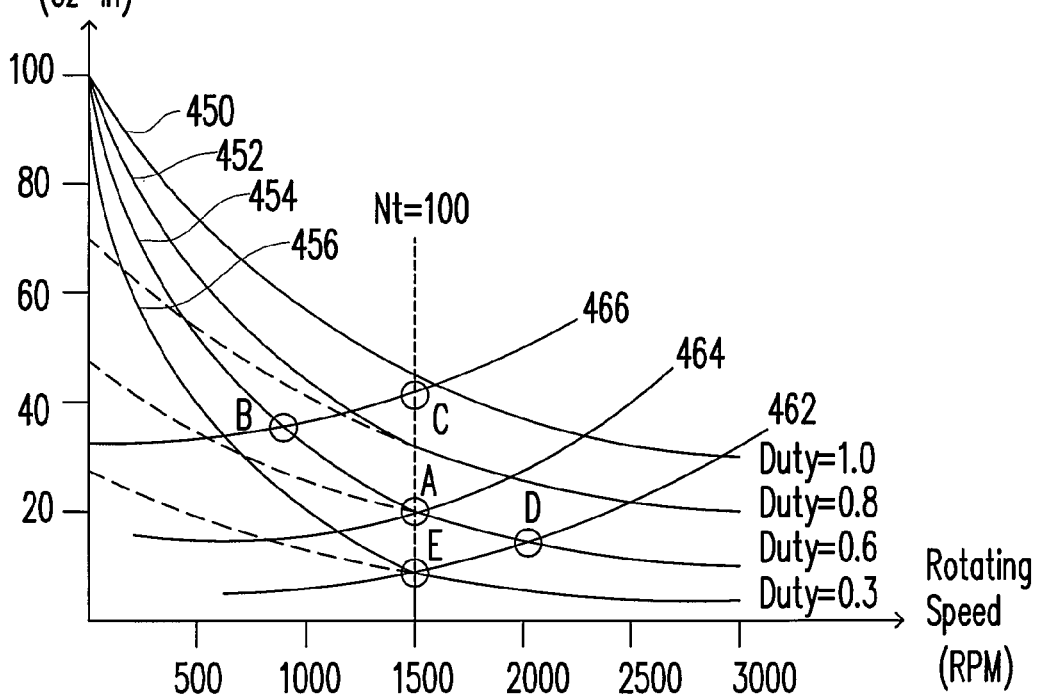
FIG. 4B is a diagram showing the torque-and-rotating-speed characteristics of a BLDC motor according to an embodiment of the present invention.

FIG. 4B shows the motor characteristic curves and the load characteristic curves according to an embodiment of the present invention. The dotted motor curves correspond to the conventional BLDC motor in FIG. 2. The solid motor curves 450, 452, 454 and 456 correspond to the BLDC motor in this embodiment. This embodiment is a circuit for controlling the rotating speed of the BLDC motor so that the rotating speed of the motor is always adjusted toward a predetermined target rotating speed no matter how the load condition changes. Unlike the conventional circuit in FIG. 2, in which the PWM signal has a constant duty cycle, this embodiment adjusts the duty cycle of the PWM signal according to the difference between the actual rotating speed and the target rotating speed, so that the actual rotating speed of the BLDC motor always shifts toward the target rotating speed. Moreover, this embodiment gives the PWM signal continuous bursts with the highest duty cycle (100%) when the actual rotating speed is lower than the target speed. Consequently, the duty cycle of the motor current converges toward 1.0 as the rotating speed approaches zero. In other words, the motor curves 452, 454 and 456 asymptotically approach the motor curve 450, offering maximum starting torque in order to overcome the stall problem.

For easier implementation, this embodiment measures the rotating speed indirectly by measuring the length of the phase time of the Hall sensor signal, which is inversely proportional to the rotating speed. The phase time is the time interval between two adjacent state changes (from low to high or from high to low) of the Hall sensor signal. This embodiment measures the phase times by using a clock generator and a counter to count the number of clock pulses in each phase time. The details are discussed below.

Figure 5:
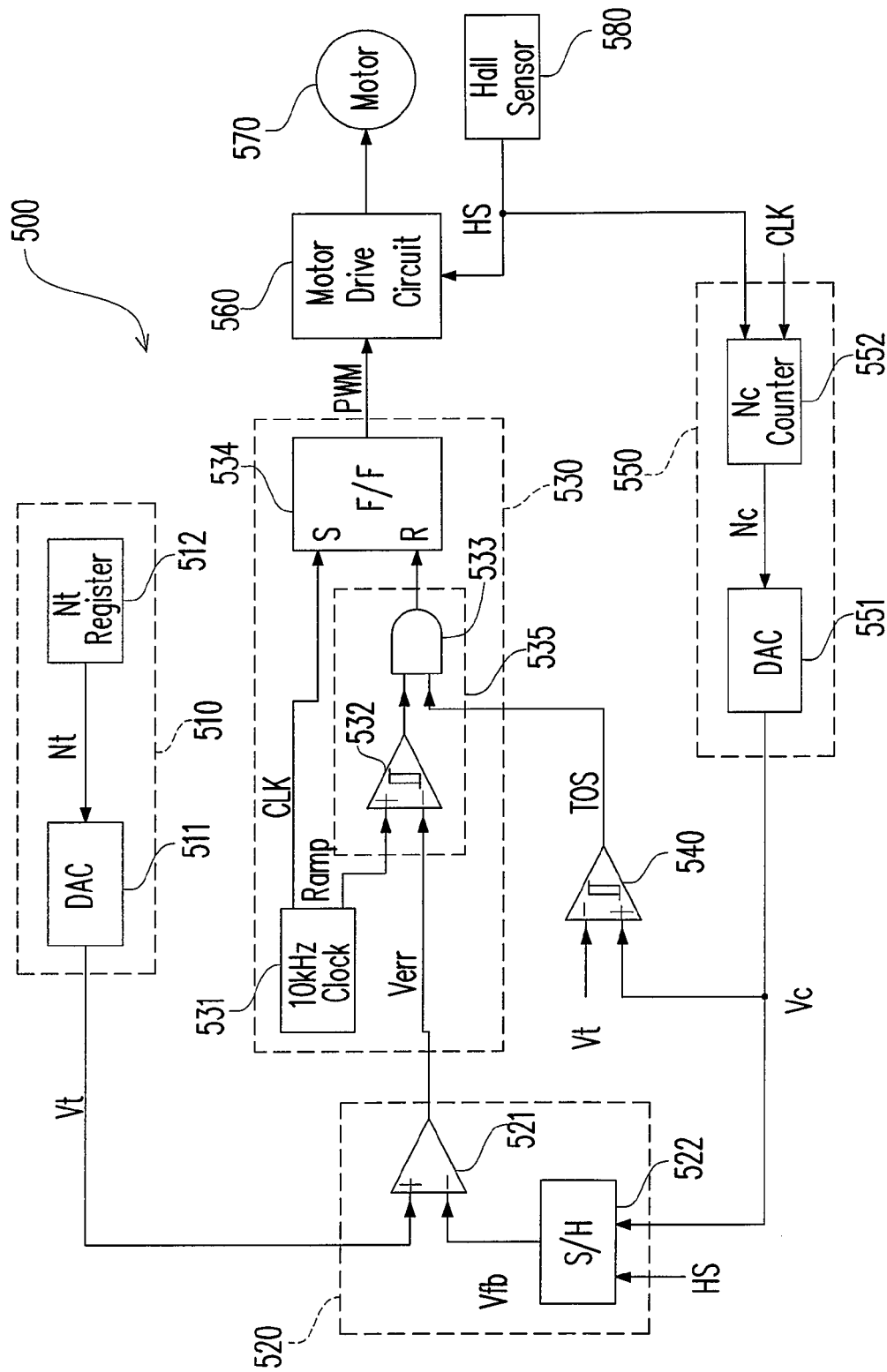
FIG. 5 is a schematic diagram showing a circuit for controlling the rotating speed of a BLDC motor according to an embodiment of the present invention.

FIG. 5 is a schematic diagram showing the circuit 500 for controlling the rotating speed of the BLDC motor 570 of this embodiment. Circuit 500 includes a Hall sensor 580, a target phase time circuit 510, an elapsed time counter 550, a time-out comparator 540, an error amplifier 520, a PWM circuit 530, and a motor drive circuit 560.

Figure 2:
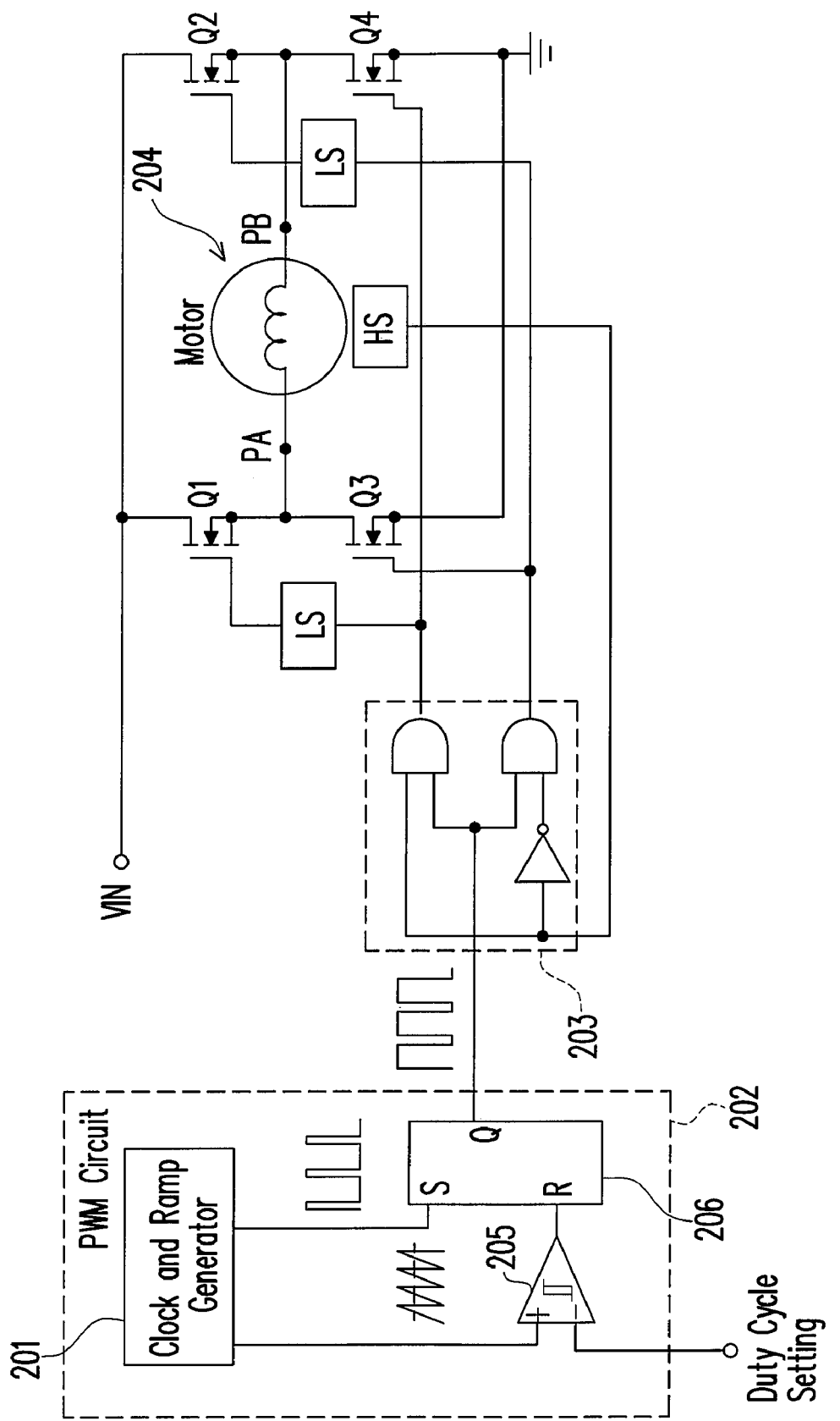
FIG. 2 is another schematic diagram showing a conventional BLDC motor and its drive circuit.
Figure 3:
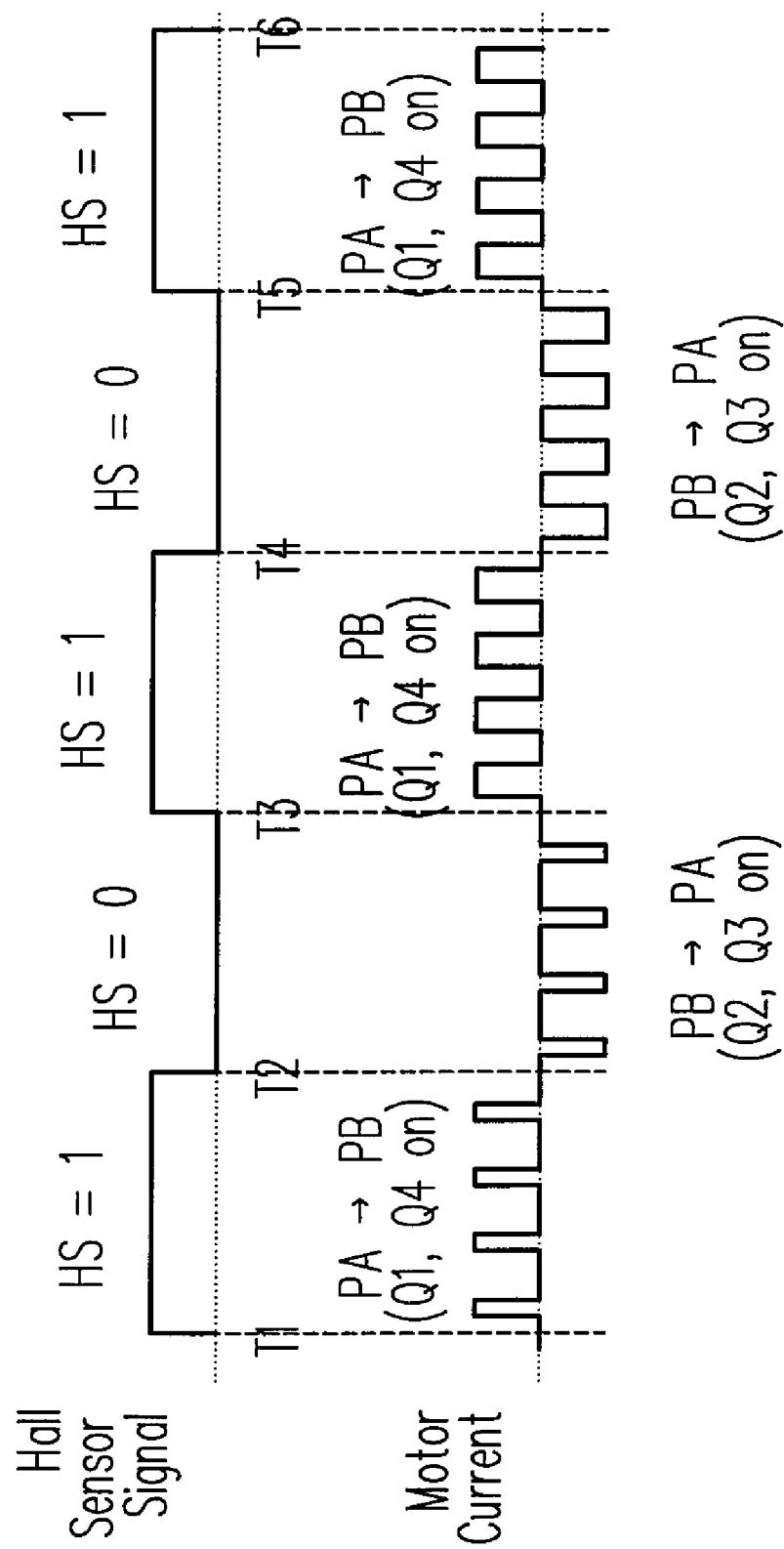
FIG. 3 shows the waveforms of the Hall sensor signal and the motor current of the BLDC motor in FIG. 2.

Hall sensor 580 works in the same way as the Hall sensors in FIG. 1 and FIG. 2 do. The change of state of the Hall sensor signal HS provided by Hall sensor 580 indicates the end of the current phase time and the beginning of the next phase time.

The purpose of target phase time circuit 510 is providing a target phase time signal Vt directly proportional to the predetermined target rotating speed of BLDC motor 570. In this embodiment target phase time circuit 510 includes a register 512 and a digital-to-analog converter (DAC) 511. Register 512 stores and provides the target phase time Nt. Nt may be derived from a rotating speed setting from the user or an embedded micro-controller. DAC 511 converts Nt into target phase time signal Vt. The target phase time signal Vt is inversely proportional to Nt. In other words, Vt is directly proportional to the target rotating speed. The level of Vt increases as the target rotating speed increases.

The purpose of elapsed time counter 550 is measuring how long the motor 570 has stayed in the current phase time. Elapsed time counter 550 includes counter 552 and DAC 551. Counter 552 receives a clock signal CLK (provided by clock generator 531) and the Hall sensor signal HS, and counts the elapsed phase time Nc, which is the number of cycles of clock signal CLK so far in the current phase time. The time-base unit for both Nt and Nc is the period of clock signal CLK. The counting of Nc is reset at the beginning of each phase time. DAC 551 converts Nc into elapsed phase time signal Vc. The signal level of Vc is inversely proportional to the value of Nc. In other words, the value of Vc is directly proportional to the actual rotating speed of motor 570.

Although target phase time signal Vt and elapsed phase time signal Vc are directly proportional to the target speed and the actual speed, respectively, in other embodiments of the present invention, target phase time signal Vt and elapsed phase time signal Vc may be inversely proportional to the target speed and the actual speed, respectively. The form and representation of target phase time signal Vt and elapsed phase time signal Vc are unimportant, as long as these two signals can be compared to determine which of the target rotating speed and the actual rotating speed is higher.

Time-out comparator 540 provides a time-out signal TOS according to the level of elapsed phase time signal Vc relative to target phase time signal Vt. On the other hand, error amplifier 520 provides an error signal Verr according to the level of an actual phase time signal Vfb relative to target phase time signal Vt. Error amplifier 520 includes operational amplifier 521 and sample-and-hold (S/H) circuit 522. S/H circuit 522 samples elapsed phase time signal Vc each time when the Hall sensor signal HS changes state, and then outputs the sampled signal as actual phase time signal Vfb. Therefore actual phase time signal Vfb represents the value of Nc at the end of the previous phase time. Operational amplifier 521 provides error signal Verr according to the difference between the actual phase time signal Vfb and the target phase time signal Vt. In this embodiment error signal Verr is an error voltage.

PWM circuit 530 provides a PWM signal for driving motor 570. The duty cycle of the PWM signal is determined according to time-out signal TOS and error signal Verr. PWM circuit 530 includes a clock generator 531, a flip-flop 534 and a resetting circuit 535. Clock generator 531 provides a clock signal CLK and a ramp signal. The PWM signal is the output of flip-flop 534, which has two input terminals, S and R. The high state (logic 1) or low state (logic 0) of the PWM signal is determined by the inputs received at input terminals S and R. Input terminal S receives clock signal CLK and input terminal R receives the output of resetting circuit 535. As a result, flip-flop 534 sets the PWM signal to the high state at the beginning of each cycle of clock signal CLK, and resets the PWM signal to the low state when the output of resetting circuit 535 is asserted. Resetting circuit 535 includes a comparator 532 and a logic AND gate 533. Comparator 532 provides its output according to the level of the ramp signal relative to error signal Verr. Logic AND gate 533 asserts the output of resetting circuit 535 when the output of comparator 532 indicates that the ramp signal is greater than error signal Verr and when time-out signal TOS indicates that the elapsed phase time Nc is shorter than the target phase time Nt. Since the PWM signal is set to the high state periodically according to clock signal CLK, the duty cycle of the PWM signal is determined by the output of resetting circuit 535.

Motor drive circuit 560 is analogous to the combination of logic circuit 203, level shifters LS and MOSFETs Q1-Q4 in FIG. 2. In brief, motor drive circuit 560 controls the motor current of BLDC motor 570 according to the PWM signal and the Hall sensor signal HS. The duty cycle of the PWM signal determines the duty cycle of the motor current, and the state of the Hall sensor signal HS determines the direction of the motor current.

Figure 6:
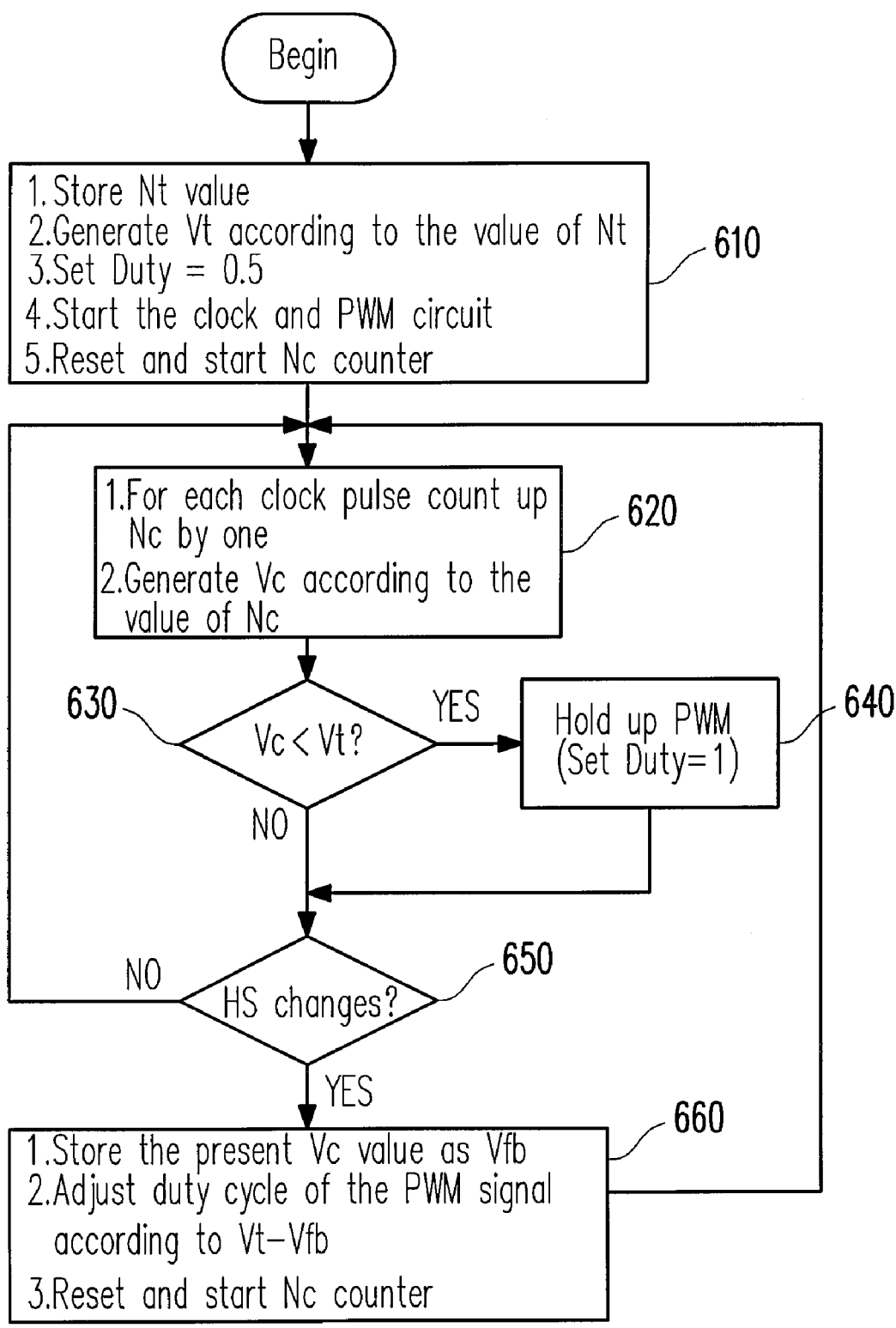
FIG. 6 is a flow chart of a method for controlling the rotating speed of a BLDC motor according to an embodiment of the present invention.

As shown in FIG. 5, the rotating speed of motor 570 is controlled by a closed-loop feedback mechanism based on the comparison of the elapsed phase time and the target phase time. FIG. 6 is a summary flow chart of the method for controlling the rotating speed of the BLDC motor 570 executed by the circuit 500. First, in step 610, the target phase time Nt is stored in register 512, DAC 511 generates target phase time signal Vt according to the value of Nt, the starting duty cycle of the PWM signal is set to be 0.5, clock generator 531 and PWM circuit 530 are started, and counter 552 is reset and started for counting the elapsed phase time Nc. In step 620, counter 552 counts up Nc by one for each pulse of clock signal CLK, and then DAC 551 generates elapsed phase time signal Vc according to the value of Nc. Next, in step 630, time-out comparator 540 compares elapsed phase time signal Vc and target phase time signal Vt. When the elapsed phase time Nc becomes greater than the target phase time Nt, elapsed phase time signal Vc becomes lower than target phase time signal Vt. Time-out signal TOS enters the low state. In step 640, the output of resetting circuit 535 enters the low state accordingly. As long as the output of resetting circuit 535 stays low, the PWM signal stays high (the motor drive output stays high), increasing the effective duty cycle of the motor current to 100% until the end of the current phase time.

Next, in step 650, counter 552 and S/H circuit 522 monitor the state of the Hall sensor signal HS. If there is no state change, the current phase time is not over and the flow returns to step 620. If there is a state change, the current phase time ends and the flow proceeds to step 660. In step 660, S/H circuit 522 samples and stores the final elapsed phase time signal Vc of the current phase time and outputs a new feedback voltage Vfb. PWM circuit 530 adjusts the duty cycle of the PWM signal according to Vt-Vfb. Counter 552 is reset and restarted by the Hall sensor signal HS for measuring the next phase time. The resetting of Nc sets time-out signal TOS to the high state. Consequently AND gate 533 simply relays the output of comparator 532 to input terminal R of flip-flop 534, resuming the normal PWM operation. If the new actual phase time signal Vfb is lower than the previous actual phase time signal Vfb, the error signal Verr becomes higher. That means the resetting of the PWM signal is postponed and the duty cycle of the PWM signal and the motor current is increased.

On the other hand, back in step 630, if the elapsed phase time Nc becomes lesser than the target phase time Nt, the new actual phase time signal Vfb is higher than the previous actual phase time signal Vfb. Therefore error signal Verr becomes lower. In this case, the PWM signal is reset earlier and the duty cycle of the PWM signal and the motor current is decreased.

Figure 7A:
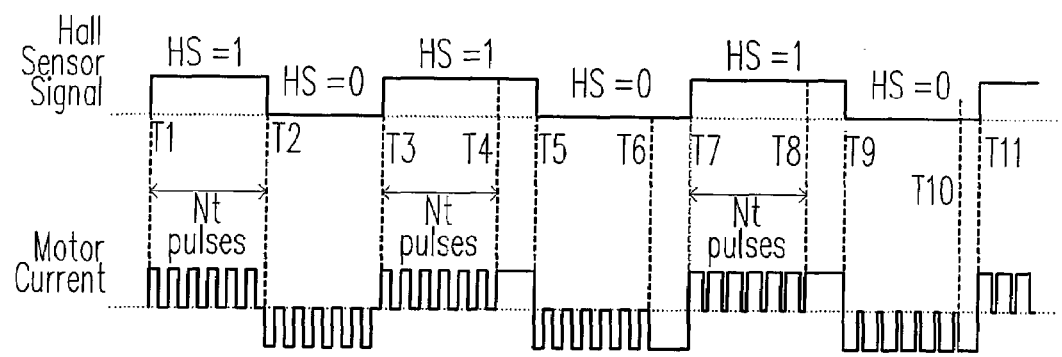
FIGS. 7A and 7B show the waveforms of the Hall sensor signal and the motor current of the BLDC motor according to an embodiment of the present invention.
Figure 7B:
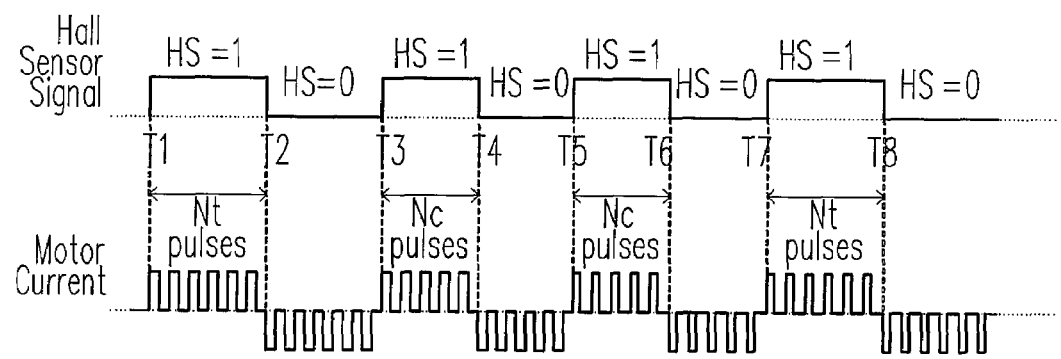

Now please refer to FIGS. 4B, 7A and 7B, which illustrate an example of the speed control mechanism according to this embodiment. In this example, the target speed is 1500 RPM as shown by the vertical dotted line in FIG. 4B. Equivalently, the rotating frequency of the motor is 25 Hz. Since there are four phase changes in each revolution, there are 100 phase changes per second, and each phase time is 10 milliseconds long. If the clock frequency is 10 kHz, the target phase time Nt is equal to 100.

FIGS. 4B and 7A illustrate the speed control mechanism after a heavier load is applied in a steady state. In the phase times from T1 to T3, the BLDC motor and the load operate at point A in FIG. 4B. There are exactly Nt clock pulses in both the phase times T1-T2 and T2-T3. At the moment T3, the motor slows down due to a heavier load and the operation point shifts from A to B in FIG. 4B. At the time moment T4, Nc becomes greater than Nt. Consequently, the PWM signal stays high and the motor current flows continuously until T5, and the duty cycle of the PWM signal is increased in the following phase times. As the duty cycle increases, the pulses of the motor current widen, the torque increases, and the operating point moves along load curve 466 toward the 1500 RPM vertical line. Eventually Nc recovers to be equal to Nt and the operation point shifts from B to C.

In this embodiment, the PWM signal stays high from the moment Nc becomes greater than Nt until the end of the current phase time. When the motor load increases, this high state provides extra boost in torque to bring up the rotating speed. The more the motor slows down, the higher torque it generates. Therefore, this embodiment is able to solve the conventional stall problem.

FIGS. 4B and 7B illustrate the speed control mechanism after a lighter load is applied. In the phase times from T1 to T3, the BLDC motor and the load operate at point A in FIG. 4B. There are exactly Nt clock cycles (or clock pulses) in both the phase times T1-T2 and T2-T3. At the moment T3, the motor speeds up due to a lighter load and the operation point shifts from A to D in FIG. 4B. At the time moment T4, Nc is detected to be less than Nt (Vfb is higher). Consequently, the duty cycle of the PWM signal is decreased in the following phase times. As the duty cycle decreases, the torque decreases and the operating point moves along load curve 462 toward the 1500 RPM vertical line. Eventually Nc recovers to be equal to Nt in the phase time from T7 to T8 and the operation point shifts from D to E. Please note that the pulses of the motor current in the phase time from T7 to T8 are narrower than the pulses in the phase times from T1 to T3.

In addition to a circuit for controlling the rotating speed of a BLDC motor, the present invention includes a method for controlling the rotating speed of a BLDC motor as well. The method is already demonstrated in details by the operation of circuit 500 of the above embodiment. The method has the same purposes and advantages as the circuit does, which are solving the stall problem faced by the conventional solutions and providing a better starting torque for driving BLDC motors with a closed-loop control mechanism.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A circuit for controlling the rotating speed of a brushless direct current (BLDC) motor, comprising:
   a target phase time circuit providing a target phase time signal proportional to a predetermined target rotating speed of the BLDC motor;
   an elapsed time counter providing an elapsed phase time signal proportional to an actual rotating speed of the BLDC motor;
   a time-out comparator providing a time-out signal according to the level of the elapsed phase time signal relative to the target phase time signal;
   an error amplifier providing an error signal according to the level of an actual phase time signal relative to the target phase time signal, wherein the actual phase time signal is obtained by sampling the elapsed phase time signal in response to a predetermined condition of the state of a Hall sensor signal, the state of the Hall sensor signal changes in response to the position of the rotor of the BLDC motor relative to the stator of the BLDC motor;
   a pulse width modulation (PWM) circuit providing a PWM signal, wherein the duty cycle of the PWM signal is determined according to the time-out signal and the error signal; and
   a motor drive circuit controlling the motor current of the BLDC motor according to the PWM signal and the Hall sensor signal, wherein the duty cycle of the PWM signal determines the duty cycle of the motor current and the state of the Hall sensor signal determines the direction of the motor current.

2. The circuit of claim 1, further comprising:
   a Hall sensor providing the Hall sensor signal, wherein the position of the Hall sensor is fixed relative to the stator, the rotor has at least two magnetic poles, the magnetic poles include a north pole and a south pole, the Hall sensor determines the state of the Hall sensor signal according to which of the magnetic poles is the closest to the Hall sensor.

3. The circuit of claim 1, wherein the predetermined condition of the Hall sensor signal is when the state of the Hall sensor signal changes.

4. The circuit of claim 1, wherein the target phase time circuit comprises:
   a register storing and providing a number proportional to the rotating period of the BLDC motor at the predetermined target rotating speed; and
   a digital-to-analog converter (DAC) for converting the number into the target phase time signal.

5. The circuit of claim 1, wherein the elapsed time counter comprises:
   a counter receiving a clock signal and counting the number of cycles of the clock signal after the last occurrence of the predetermined condition of the Hall sensor signal; and
   a DAC for converting the number of cycles into the elapsed phase time signal.

6. The circuit of claim 1, wherein the error amplifier comprises:

a sample-and-hold (S/H) circuit sampling the elapsed phase time signal and providing the actual phase time signal; and an operational amplifier providing the error signal according to the difference between the actual phase time signal and the target phase time signal.

7. The circuit of claim 1, wherein the PWM circuit comprises:

a clock generator providing a clock signal and a ramp signal;

a flip-flop providing the PWM signal, wherein the flip-flop sets the PWM signal at the beginning of each cycle of the clock signal; and a resetting circuit asserting its output according to the ramp signal, the error signal and the time-out signal, wherein the flip-flop resets the PWM signal when the output of the resetting circuit is asserted.

8. The circuit of claim 7, wherein the resetting circuit comprises:

a resetting comparator providing its output according to the level of the ramp signal relative to the error signal; and a logic circuit asserting the output of the resetting circuit when the output of the resetting comparator indicates that the ramp signal is greater than the error signal and when the time-out signal indicates that the elapsed phase time signal is greater than the target phase time signal.

9. A method for controlling the rotating speed of a BLDC motor, comprising:

providing a target phase time signal proportional to a predetermined target rotating speed of the BLDC motor;

providing an elapsed phase time signal proportional to an actual rotating speed of the BLDC motor;

providing a time-out signal according to the level of the elapsed phase time signal relative to the target phase time signal;

providing a Hall sensor signal, wherein the state of the Hall sensor signal changes in response to the position of the rotor of the BLDC motor relative to the stator of the BLDC motor;

providing an actual phase time signal by sampling the elapsed phase time signal in response to a predetermined condition of the state of the Hall sensor signal;

providing an error signal according to the level of the actual phase time signal relative to the target phase time signal;

providing a PWM signal, wherein the duty cycle of the PWM signal is determined according to the time-out signal and the error signal; and controlling the motor current of the BLDC motor according to the PWM signal and the Hall sensor signal, wherein the duty cycle of the PWM signal determines the duty cycle of the motor current and the state of the Hall sensor signal determines the direction of the motor current.

10. The method of claim 9, wherein the predetermined condition of the Hall sensor signal is when the state of the Hall sensor signal changes.

11. The method of claim 9, wherein the target phase time signal is derived from a number proportional to the rotating period of the BLDC motor at the predetermined target rotating speed.

12. The method of claim 9, wherein the elapsed phase time signal is derived from the number of cycles of a clock signal after the last occurrence of the predetermined condition of the Hall sensor signal.

13. The method of claim 9, wherein the step of providing the PWM signal comprises:

providing a clock signal and a ramp signal;

setting the PWM signal at the beginning of each cycle of the clock signal; and resetting the PWM signal according to the ramp signal, the error signal and the time-out signal.

14. The method of claim 13, wherein the step of resetting the PWM signal comprises:

providing an output signal according to the level of the ramp signal relative to the error signal; and resetting the PWM signal when the output signal indicates that the ramp signal is greater than the error signal and when the time-out signal indicates that the elapsed phase time signal is greater than the target phase time signal.

* * * * *